United States Patent [19]
Lyon et al.

[11] Patent Number: 5,850,387
[45] Date of Patent: *Dec. 15, 1998

[54] PROCESSOR DEVICE FOR TERMINATING AND CREATING SYNCHRONOUS TRANSPORT SIGNALS

[75] Inventors: Daniel P. Lyon, Richardson; Richard Schroder, Plano; E. Lawrence Read, Plano; Sharlene C. Lin, Plano; Michael J. Hanlon, Plano; Stephen A. Deschaine, Garland, all of Tex.

[73] Assignee: DSC CommunicationS Corporation, Plano, Tex.

[ * ] Notice: The term of this patent shall not extend beyond the expiration date of Pat. No. 5,675,580.

[21] Appl. No.: 944,674

[22] Filed: Oct. 6, 1997

Related U.S. Application Data

[63] Continuation of Ser. No. 417,102, Apr. 5, 1995, Pat. No. 5,675,580.

[51] Int. Cl.⁶ .................................................. H04L 12/52
[52] U.S. Cl. ......................... 370/250; 370/359; 370/395; 370/474; 370/503; 370/535
[58] Field of Search .................................... 370/241, 242, 370/244, 250, 359, 395, 474, 476, 503, 352, 358, 386, 388, 466, 535, 539, 468; 359/135

[56] References Cited

U.S. PATENT DOCUMENTS

| | | | |
|---|---|---|---|
| 5,040,170 | 8/1991 | Upp et al. | 359/135 |
| 5,267,239 | 11/1993 | Pospischil et al. | 370/539 |
| 5,436,890 | 7/1995 | Read et al. | 370/352 |

FOREIGN PATENT DOCUMENTS 9006645  6/1990  WIPO .............................. H04J 3/22

OTHER PUBLICATIONS

Bergvist et al., AXD 4/1, a Digital Cross–Connect System Ericsson Review No. 3, 1992.

Robert W. Pullen, Bandwidth Management In The Asynchronous To Sonet Transition 1992–1993 Annual Review of Communications.

Primary Examiner—Douglas W. Olms
Assistant Examiner—Seema S. Rao
Attorney, Agent, or Firm—Baker & Botts, L.L.P.

[57] ABSTRACT

In the inbound direction, a tributary processor (32) includes an SPE encoder/decoder for extracting a synchronous payload envelope (SPE) from an STS-1P signal. A path terminator (62) may extract DS3 signals or a matrix payload envelope (MPE) from the STS-1P SPE. A DS1/DS3 extractor (68) generates DS1 signals from either the DS3 or MPE signals. An MPE mapper (70) creates MPE signals from the DS1 signals. A wideband stage interface (74) converts the MPE signals into matrix transport format (MTF) signals for cross-connection in a wideband center stage matrix (22). In the outbound direction, the wideband stage interface (74) receives MTF signals from the wideband center stage matrix (22) and generates MPE signals therefrom. The MPE signals are sent through the MPE mapper (70) in order to extract DS1 signals. The DS1 signals are converted to DS3 signals or another MPE mapping by the DS1/DS3 extractor (68). The path terminator receives DS3 or MPE signals for conversion into an STS-1P SPE. The SPE encoder/decoder creates the STS-1P signals from the STS-1P SPE for transmission to the appropriate interfaced subsystem or network.

18 Claims, 11 Drawing Sheets

COH – CHANNEL OVERHEAD
VTP – VT PARITY
R – RESERVED

THE MATRIX TRANSPORT FORMAT CONTAINS 28 CHANNELS WITH EACH CHANNEL HAVING A CAPACITY OF 37 BYTES (296 BITS) PER FRAME

THE CHANNELS ARE BIT INTERLEAVED ON THE MATRIX TRANSPORT LINKS

MF X – MATRIX FRAME X
CH X – CHANNEL X BIT POSITION
MF FRM CODE – 0111

PROCESSOR DEVICE FOR TERMINATING AND CREATING SYNCHRONOUS TRANSPORT SIGNALS

CROSS REFERENCE TO RELATED APPLICATIONS

This application is a continuation application of U.S. application Ser. No. 08/417,102, filed Apr. 5, 1995 and entitled "Processor Device for Terminating and Creating Synchronous Transport Signals," by Daniel P. 'Lyon, Richard (nmi) Schroder, Gary D. Hanson, E. Lawrence Read, Sharlene C. Lin, Michael J. Hanlon, and Stephen A. Deschaine, now U.S. Pat. No. 5,675,580, issued Oct. 7, 1997.

TECHNICAL FIELD OF THE INVENTION

The present invention relates in general to telecommunication network signalling and more particularly to a processor device for terminating and creating synchronous transport signals.

BACKGROUND OF THE INVENTION

Digital cross-connect systems are an integral part of today's modern telecommunications transport network. They are increasingly used by all service providers including exchange carriers, long distance carriers, and competitive by-pass carriers. Significant technology advancements have allowed digital cross-connect systems to evolve from narrowband grooming and test applications to crossconnection of larger network signals in wideband and broadband frequency domains.

Conventional digital cross-connect systems have largely been based on a single core architecture approach where all cross-connections are made through a single switching node or matrix. However, most transport network architectures are based on a layered signal structure where one layer must be completely exposed or processed before accessing the next layer. To completely handle layered signal structure network architectures, digital cross-connect systems capable of handling different feature requirements must be connected in series.

For multiple digital cross-connect systems connected in series, a broadband system is first used to terminate high speed optical and electrical signals in order to path terminate and groom lower speed broadband signals. The broadband system also supports performance monitoring and test access functions. A payload containing the broadband signals is then connected to a wideband system to support similar functions in obtaining wideband signals. The wideband signals are then terminated by a narrowband system. For a hub office, the procedure is done in reverse order in order for signals to leave the office.

As new services, new capabilities, and new network transport signals that increase network complexity develop and evolve, a higher emphasis is placed on test access functions to improve network survivability and service quality through quick fault isolation and reduce outage duration. However, in conventional cross-connect systems connected in series, once a signal is terminated to extract embedded signals, access monitoring and test of the terminated signal is lost.

A series of single digital cross-connect systems cannot provide complete test access to signals carried over the network. Failure to provide complete performance monitoring, test access, path termination, and grooming functions at all network levels can significantly impact network survivability and office flexibility.

From the foregoing, we have recognized that a need has arisen for a digital cross-connect system that overcomes the reliability problems of conventional digital cross-connect systems. We have conceived that there is a utility for a digital cross-connect system that can perform complete test access and monitoring of all signals in a layered signal structure. Further, it would be advantageous to have a single cross-connect system that can process all signals embedded within a multi-layer signal structure.

SUMMARY OF THE INVENTION

In accordance with the present invention, a processor device for terminating and creating synchronous transport signals is provided that substantially eliminates or reduces disadvantages and problems associated with other telecommunication signalling techniques.

According to an embodiment of the present invention, there is provided a processor device for terminating and creating synchronous payload envelope encoder/decoder that receives the synchronous transport signal and extracts a synchronous payload envelope therefrom. The synchronous transport signal has a non-standard overhead field layout to enhance signalling functions. A path terminator receives the synchronous payload envelope and maps embedded signals within the synchronous payload envelope into matrix payload envelope frames. The matrix payload envelope frames carry any of various network signals in a byte interleaved format regardless of the type of network signal desired to be sent. A wideband stage interface converts the matrix payload envelope frames into matrix transport format frames having a bit interleaved format. The matrix transport frames are then cross-connected to the appropriate destination.

The present invention provides various technical advantages over other telecommunication signalling techniques. For example, one technical advantage is in interfacing with the network and other subsystems despite differing operating signal rates. Another technical advantage is in using a common proprietary signalling format for cross-connecting data signals. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
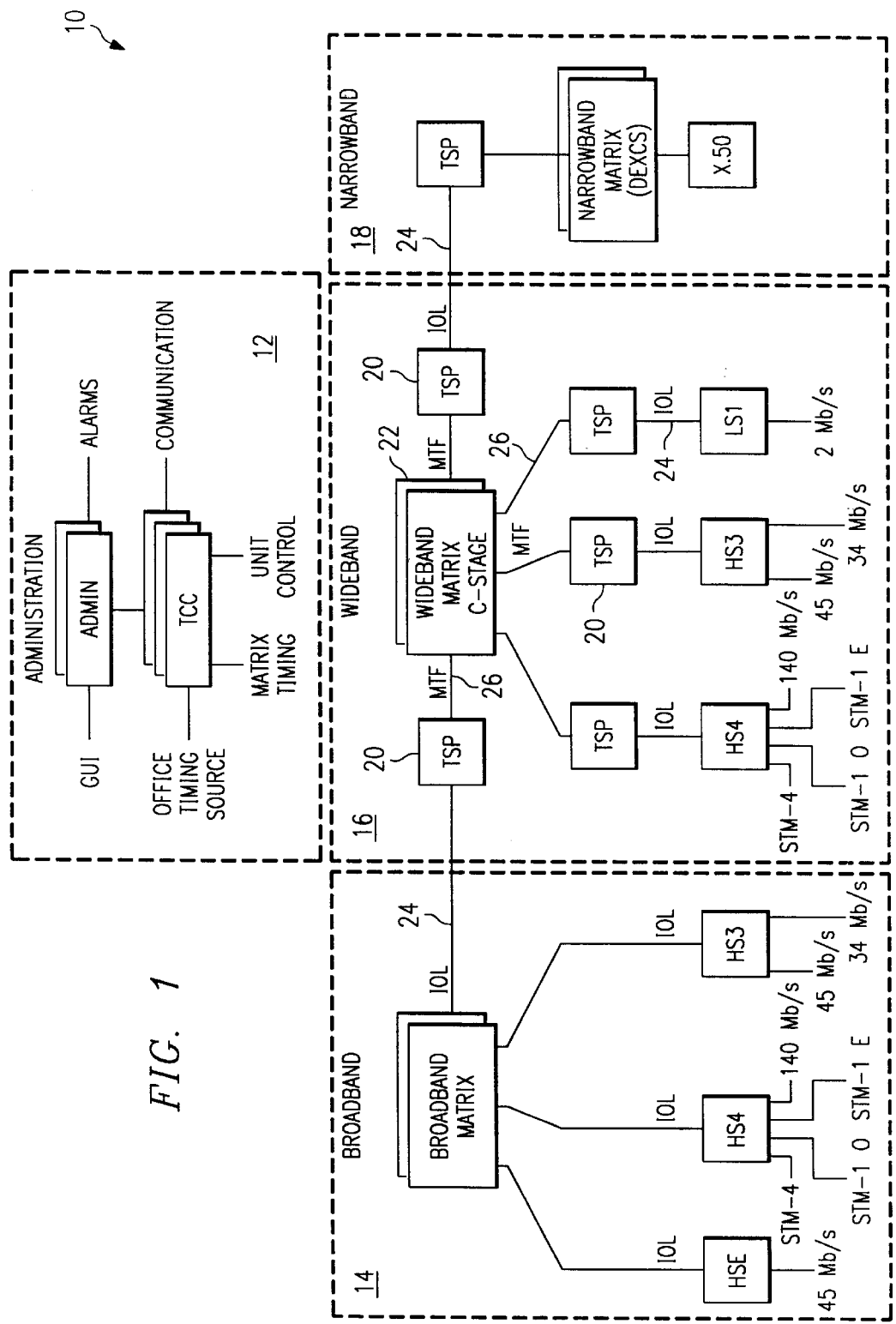
FIG. 1 illustrates a block diagram of an integrated multi-rate cross-connect system.

FIG. 1 is a block diagram of an integrated multi-rate cross-connect system 10. Integrated multi-rate cross-connect system 10 includes an administration subsystem 12, a broadband subsystem 14, a wideband subsystem 16, and a narrowband subsystem 18. Integrated multi-rate cross-connect system 10 integrates different subsystem types into a single cross-connect system. Broadband subsystem 14 receives network optical and electrical signals for processing and cross-connection back to the network or to wideband subsystem 16. Wideband subsystem 16 receives lower rate network signals for cross-connection back to the network directly or through broadband subsystem 14 or narrowband subsystem 18. Separate subsystems are provided for the broadband, narrowband, and the wideband rates with a common control architecture linking the individual subsystems.

Integrated multi-rate cross-connect system 10 can be designed for both domestic and international applications. For domestic applications, integrated multi-rate cross-connect system 10 provides the capability to rapidly cross-connect domestic signals at virtual transport VT, DS1, DS3, synchronous transport signal STS-1, optical carrier OC-3, and optical carrier OC-12 rates. For international applications, integrated multi-rate cross-connect system 10 provides the capability to rapidly cross-connect virtual container VC-11, virtual container VC-12, virtual container VC-3, and virtual container VC-4 contained within synchronous transport module STM-1, synchronous transport module STM-4, and synchronous transport module STM-16 links or mapped from 2M, 34M, 45M, and 140M links, terminating within the subsystems. Further information about the general operation of integrated multi-rate cross-connect system 10 can be found in co-pending U.S. patent application, Ser. No. 08/176,548, now U.S. Pat. No. 5,436,890, entitled "Integrated Multi-Rate Cross-Connect System", commonly assigned with the present application to DSC Communications Corporation, and hereby incorporated by reference herein.

Wideband subsystem 16 receives signals from broadband subsystem 14, narrowband subsystem 18, or the network, for path termination, demultiplexing/multiplexing, processing, and cross-connection through a tributary signal processing subsystem 20 resource. The resource concept employed in wideband subsystem 16 is a significant advantage of integrated multi-rate cross-connect system 10, providing a pool of easily managed resources which can be provisioned and reassigned on demand rather than as dedicated hardware which requires physical installation and removal to implement configuration changes.

Tributary signal processing subsystems 20 act as interfaces between wideband matrix center stage 22 and broadband subsystem 14, narrowband subsystem 18, and network interfaces through communication over internal transmission links 24. Internal transmission links 24 transport optical IOL-12 signals to the subsystems. Tributary signal processing subsystems 20 perform performance monitoring, multiplexing/demultiplexing, format conversion, and mapping functions between synchronous and asynchronous network signals. Originating and terminating stages of a wideband matrix are provided by tributary signal processing subsystems 20 for interfacing with wideband matrix center stage 22 in order to provide redundant three stage non-blocking cross-connects with error free redundant plane and clock switching arrangement under normal operating conditions. Signals within wideband subsystem 16 are cross-connected over internal synchronous channels 26 having a wideband matrix transport format (MTF). Tributary signal processing subsystems 20 provide the capability to integrate separate signal rates within a single system for communication within a telecommunication network.

Figure 2:
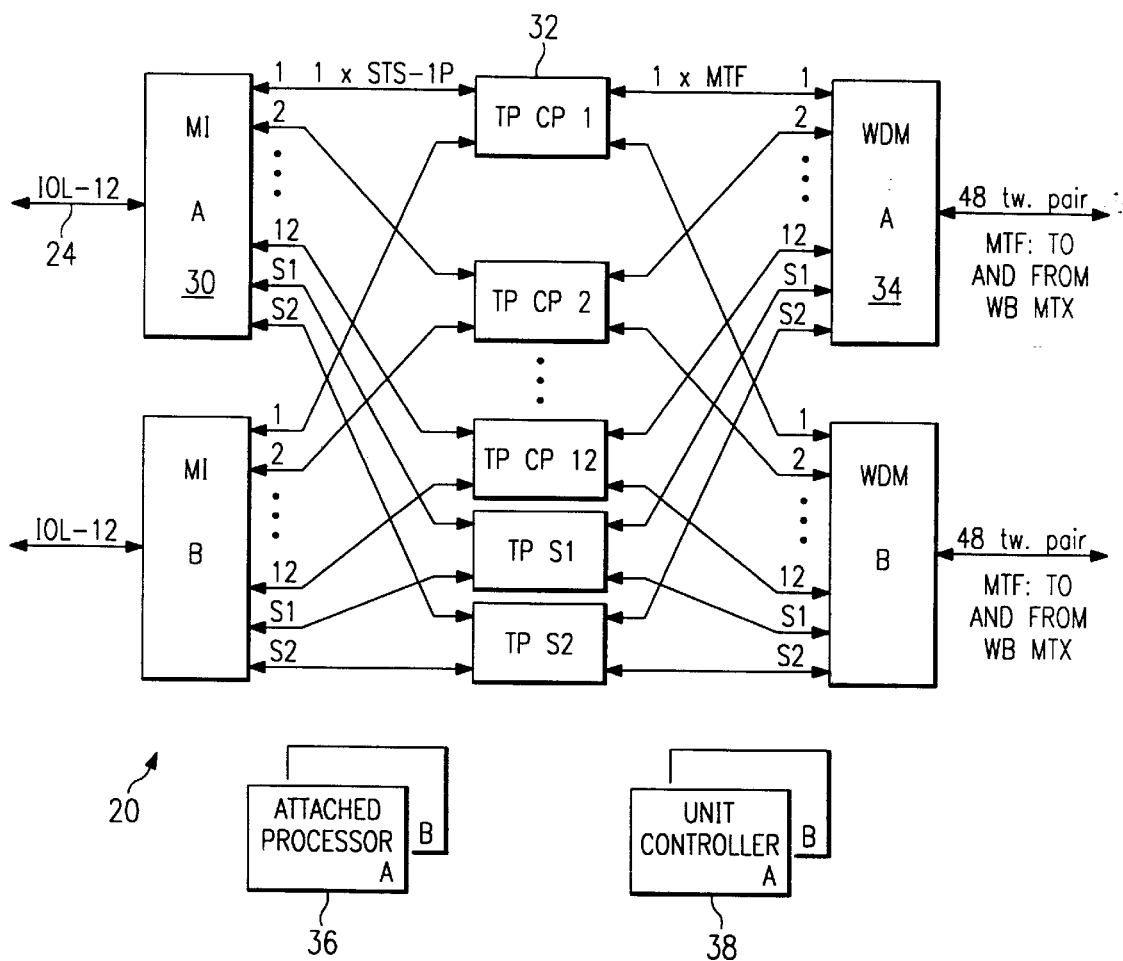
FIG. 2 illustrates a block diagram of a tributary signal processing subsystem within the integrated multi-rate cross-connect system.

FIG. 2 is a block diagram of a domestic tributary signal processing subsystem 20. Tributary signal processor 20 includes a matrix interface 30, a plurality of tributary processors 32 including spares, a wideband digital matrix unit originating/terminating stage 34, an attached processor 36, and a unit controller 38. Each unit within tributary signal processor 20 has an identical corresponding redundant unit to insure continuous operations of tributary signal processing subsystem 20 despite failures in any one unit.

In operation, tributary signal processing subsystem 20 receives twelve STS-1P signals carried over internal transmission link 24. Internal transmission link 24 preferably employs optical communications using a SONET OC-12 rate and frame structure. Internal transmission links 24 interconnect cross-connect subsystems and transport network traffic, timing, control, and maintenance information.

In the inbound direction, matrix interface 30 recovers clock, data, and frames from internal transmission link 24. Matrix interface 30 converts the IOL-12 optical signal from internal transmission link 24 into an equivalent STS-12P electrical signal. Matrix interface 30 demultiplexes the STS-12P signal carried on internal transmission link 24 into twelve STS-1P signals. Matrix interface 30 aligns the STS-1P signals and performs selective monitoring of one of the twelve STS-1P signals. Matrix interface 30 recovers clock and data for each of the twelve STS-1P signals plus two spare sets of signals for transmission to tributary processors 32. Overhead, control, and maintenance information are extracted from internal transmission link 24 for transmission to unit controller 38.

Each tributary processor 32 receives a pair of STS-1P signals from redundant matrix interface units 30. Tributary processors 32 select and terminate one STS-1P signal. The STS-1P signals are framed up and phase aligned prior to extracting the synchronous payload envelope of the STS-1P signal. For synchronous processing, VT signals on the STS-1P SPE are locked to the local wideband timebase in frequency and phase through pointer processing and mapped into a Matrix Payload Capacity (MPC) format. DS1 signals may be extracted from the VT signals prior to mapping into the MPC format. For asynchronous processing, DS3 signals are extracted from the STS-1P SPE and DS1 signals are extracted from the terminated DS3 signals and desynchronized to produce DS1 signals. The DS1 signals are mapped into the MPC format. The MPC signals are mapped into a Matrix Payload Envelope (MPE) for conversion into a Matrix Transport Format (MTF). The MTF signals are transmitted to wideband digital matrix unit originating/terminating stage 34 in a 68.672 Mbit/sec stream. Tributary processors 32 may also be configured to support DS3 signal termination.

Wideband digital matrix unit originating/terminating stage 34 receive MTF signals from each tributary processor 32 (including spares). The MTF signals are shunt terminated and pass through a 14×24 crosspoint switch. The twenty-four outputs are converted to differential signals for transmission to wideband matrix center stage 22.

In the outbound direction, wideband digital matrix unit originating/terminating stage 34 receive 24 differential MTF signals from wideband matrix center stage 22. The MTF signals are converted to single ended signals and then passed through a crosspoint switch. The fourteen outputs of the crosspoint switch are transmitted to each tributary processor 32.

Each tributary processor 32 receives a pair of MTF signals from redundant wideband digital matrix unit originating/terminating stage 34. The MTF signals are framed up and phase aligned. Tributary processors 32 demultiplex the MTF signals into MPE signals and select one set of MPE signals for extracting the MPC signals. For synchronous processing, VT signals are extracted from the MPC signals and mapped into an STS-1P SPE. For asynchronous processing, DS1 signals are extracted from the MPC signals and multiplexed into DS3 signals. The DS3 signals are mapped into the STS-1P SPE. For gateway processing, DS1 signals are extracted from the MPC signals and mapped into VT1.5 signals. Resulting processed signals are placed into a synchronous payload envelope and STS-1P signals are constructed from the STS-1P SPE and retimed to the local matrix interface timebase. The STS-1P signals are sent to matrix interface 30 for output transmission.

Matrix interface 30 receives fourteen STS-1P clock and data signals, twelve primary and two spares, from tributary processors 32. Twelve of the fourteen STS-1P signals are multiplexed into an equivalent STS-12P electrical signal. The equivalent STS-12P electrical signal is converted into an optical signal for transmission over internal transmission link 24. Control and maintenance information are received from unit controller 38 and inserted into the equivalent STS-12P electrical signal.

For a tributary signal processing subsystem 20 acting as an interface between the broadband subsystem 12 and the wideband subsystem 14, matrix interface 30 receives information from the broadband subsystem 12 based on the broadband timebase. Matrix interface 30 is a timing slave to broadband subsystem 14 and information for internal transmission link 24 is loop timed on matrix interface 30. Broadband timing is terminated on tributary processors 32 where the STS-1P SPE is retimed to the local timebase. The local timebase is derived from the wideband timebase of wideband subsystem 16.

Unit controller 38 contains the bulk of the control firmware for tributary signal processing subsystem 20. Unit controller 38 processes control information from administration subsystem and transfers control information to tributary processor 32, matrix interface 30, wideband digital matrix unit originating/terminating stage 34, and attached processor 36. Unit controller 38 communicates with each component of tributary signal processing subsystem through point-to-point three wire interfaces for serial data, clock, and reset signals. Unit controller 38 performs the control, monitoring, alarm reporting, and recovery support necessary for operation at tributary signal processing subsystem 20.

Attached processor 36 multiplex STS-1P Path, DS3 Path, and VT Path overhead received from tributary processors 32 for inbound signal flow. Attached processor 36 provides serial overhead interfaces to tributary processors 32. Overhead not terminated on tributary processors 32 are sent to attached processor 36 by multiplexing onto a serial multi-channel overhead bus for further processing. In the outbound direction, attached processor 36 receives overhead data from the serial multi-channel overhead bus, demultiplexes the overhead data onto point-to-point links to tributary processors 32, and transmits the overhead data to tributary processors 32 for insertion into the outbound signal.

Figures 3, 5:
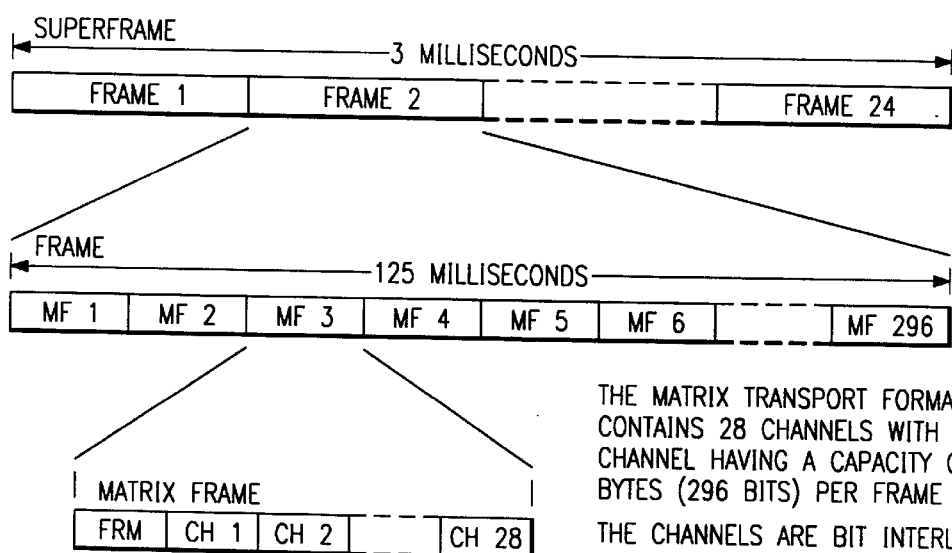
FIG. 3 illustrates an example of matrix payload capacity frames used by the tributary signal processing subsystem.
FIG. 5 illustrates an example of a matrix transport format used by the tributary signal processing subsystem.

FIG. 3 shows an example of mapping in matrix payload capacity frames for a DS-1 signal. Matrix payload capacity frames have a structure similar to a VT1.5 signal except that overhead bytes are used for internal wideband functions. DS-1 signals are mapped into a matrix payload capacity frame in a similar manner as defined for a SONET VT1.5 signal.

Matrix payload capacity signals are mapped into a matrix payload envelope. Network traffic is transported through tributary signal processing unit 32 in matrix payload envelope frames that have been defined for carrying various network signals. The matrix payload envelope payload will contain the capacity of 36 fields and an internal overhead field for mapping of various asynchronous network signals. Each of the fields provides one byte position for 28 channels plus a null byte. The null byte is used to fill out the total bandwidth available for the MPE payload. Matrix payload envelopes carry an STS-1 payload capacity.

Figure 4:
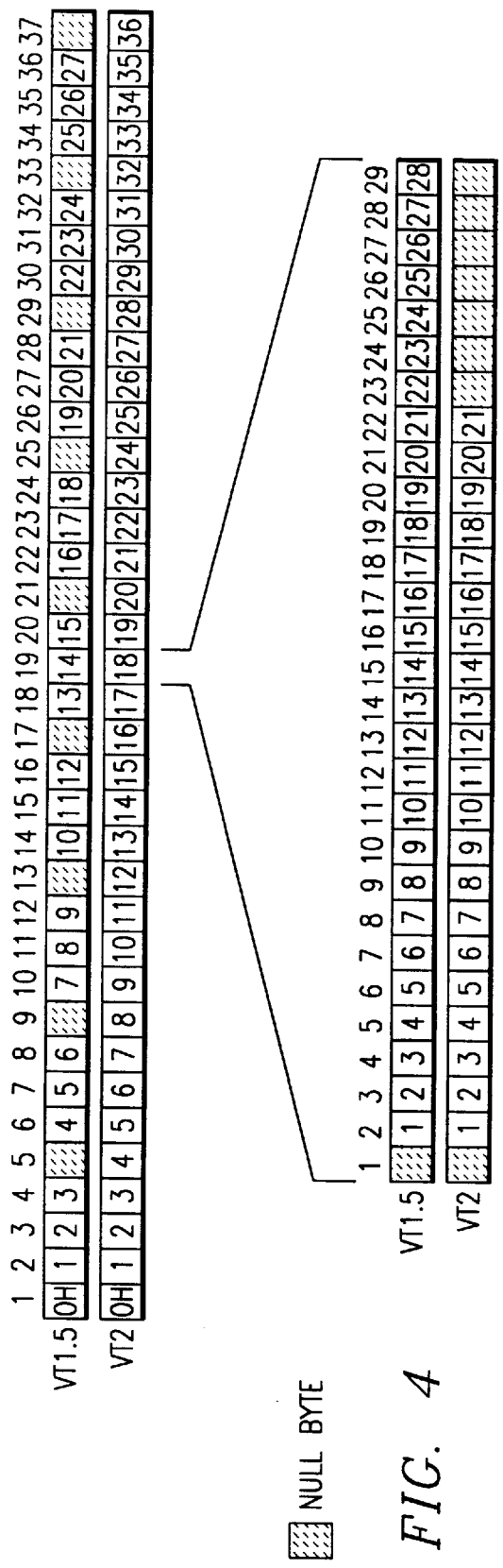
FIG. 4 illustrates an example of matrix payload envelopes used by the tributary signal processing subsystem.

FIG. 4 shows an example of a matrix payload envelope. The matrix payload envelope is in a byte interleave data format which is mapped into a bit interleave signal in the form of a matrix transport format for serial transmission to wideband matrix center stage 22.

Signals are transported through wideband matrix center stage 22 in 125 microsecond synchronous frames using the matrix transport format. FIG. 5 shows an example of the matrix transport format. Matrix transport format links provide 28 wideband channels, each channel capable of carrying a VT1.5 or VT2 payload. The matrix channels are bit interleaved on matrix transport format frames to minimize delay and storage requirements of the matrix switching elements.

A super frame consisting of 24 matrix transport format frames has been defined to provide a bandwidth efficient means of transporting certain internal wideband maintenance information. The matrix transport format frames contain 296 matrix frames corresponding to the 296 bits (37 bytes) carried in the matrix channels. Each matrix frame carries one bit for each of the 28 wideband matrix channels plus a frame bit. Matrix transport format signals are transmitted from tributary signal processor 32 to wideband digital matrix unit originating/terminating stage 34 in a serial 68.672 Mbit/s wideband frequency stream in order to enter the originating stage of the wideband cross-connect matrix for processing through wideband matrix center stage 22.

The matrix payload capacity frames carry asynchronous signals mapped using standard SONET asynchronous mappings. By mapping matrix payload capacity frames into matrix payload envelopes, additional overhead can be added that was not supported in the matrix payload capacity format. To reduce storage requirements, the matrix payload envelopes having a parallel format are mapped into the serial scheme of the matrix transport format. The serial scheme requires the storage of only a single bit unlike multiple storage required for the parallel format of the matrix payload envelope. Further, framing overhead can be added in the mapping from matrix payload envelopes into the matrix transport format.

Figure 6:
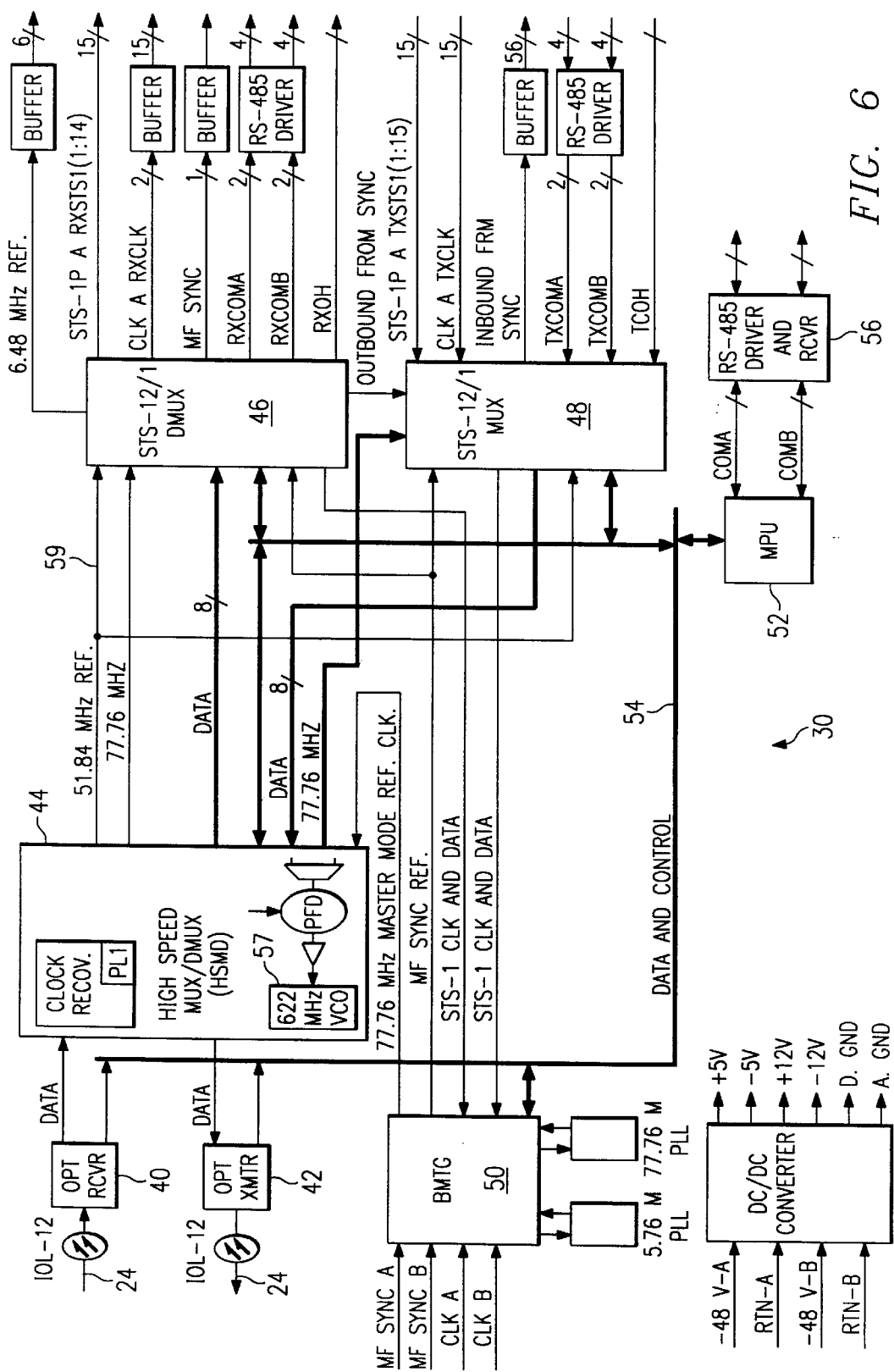
FIG. 6 illustrates a block diagram of a matrix interface within the tributary signal processing subsystem.

FIG. 6 is a block diagram of matrix interface 30. In the inbound direction, matrix interface 30 includes an optical receiver 40 that converts a proprietary IOL-12 optical signal to a proprietary STS-12P electrical signal. The proprietary STS-12P electrical signal from optical receiver 40 is converted into an STS-12P byte wide data stream by a high speed multiplexer/demultiplexer 44. The STS-12P byte wide data format from high speed multiplexer/demultiplexer 44 is converted into twelve primary STS-1P signals in bit serial format by STS demultiplexer 46. STS demultiplexer 46 performs data synchronization through a 77.76 MHz STS-12P bit clock generated by high speed multiplexer/demultiplexer 44. For each of the twelve primary STS-1P signals, STS demultiplexer 46 generates a corresponding clock signal. STS demultiplexer 46 also generates two additional STS-1P signals with corresponding clock signals to accommodate sparing requirements. Each STS-1P signal and corresponding clock signal is transmitted to tributary processor 32.

In the outbound direction, matrix interface 30 receives twelve primary and two spare STS-1P signals from tributary processors 32 in bit serial format at STS multiplexer 48. STS multiplexer 48 receives a clock signal for each of the twelve STS-1P signals and receives two additional STS-1P signals with corresponding clock signals to accommodate sparing. STS multiplexer 48 phase aligns the twelve primary STS-1P signals in bit serial format and converts them to an STS-12P byte wide data format. The STS-12P byte wide data format is transmitted to high speed multiplexer/demultiplexer 44 for serialization into an STS-12P serial bit stream. The STS-12P serial bit stream is transmitted to optical transmitter 42 as an electrical signal. Optical transmitter 42 converts the STS-12P electrical signal into an IOL-12 optical signal for transmission out of matrix interface 30.

Matrix interface 30 also includes a broadband monitor and test generator 50 that contains an STS-1P monitoring function which is used as an aid in fault isolation. Broadband monitor and test generator 50 receives one serial STS-1P signal and corresponding clock signal from STS demultiplexer 46 and STS multiplexer 48. Broadband monitor and test generator 50 frames the STS-1P signals and extracts and verifies the information contained within the STS-1P signals. Faults are more easily detected and isolated through the monitoring of both inbound and outbound STS-1P signals.

Matrix interface 30 also includes a microprocessor unit 52 that provides command and control for matrix interface 30. A common bus interface 54 links microprocessor unit 52 to all components within matrix interface 30. Microprocessor unit 52 provides links to unit controllers 38 within tributary signal processing subsystem 20 for processing of control and overhead information. Information transferred between microprocessor unit 52 and unit controller 38 is achieved by a serial data link through a driver receiver circuit 56.

Matrix interface 30 performs two different timing functions depending on the location of tributary signal processing subsystem 20 in integrated multi-rate cross-connect system 10. For interfacing between broadband subsystem 14 and wideband subsystem 16, matrix interface 30 receives the IOL-12 signal based on the broadband timebase. Matrix interface 30 is a timing slave to broadband subsystem 14 and the IOL-12 signal on internal transmission link 24 is loop timed in matrix interface 30. The recovered clock from the IOL-12 signal is used as a reference for a local 622 MHz voltage controlled oscillator 57. A local multiframe reference signal 59 is generated using a broadband multiframe sync signal plus a servo offset received from unit controller 38 through microprocessor unit 52. Broadband timing is transmitted to tributary processors 32 with the fourteen STS-1P signals.

For interfacing between narrowband subsystem 18 and wideband subsystem 16, matrix interface 30 sources the IOL-12 signal to the wideband timebase. Matrix interface 30 receives 6.48 MHz clock and multiframe references from wideband digital matrix unit originating/terminating stage 34. A set of timing signals is selected and used as a reference for 622 MHz VCO 57. A local multiframe reference is generated using a selected multiframe sync plus a servo offset received from unit controller 38 through microprocessor unit 52. This wideband based timing is transmitted to narrowband subsystem 18 over internal transmission link 24.

Figure 7:
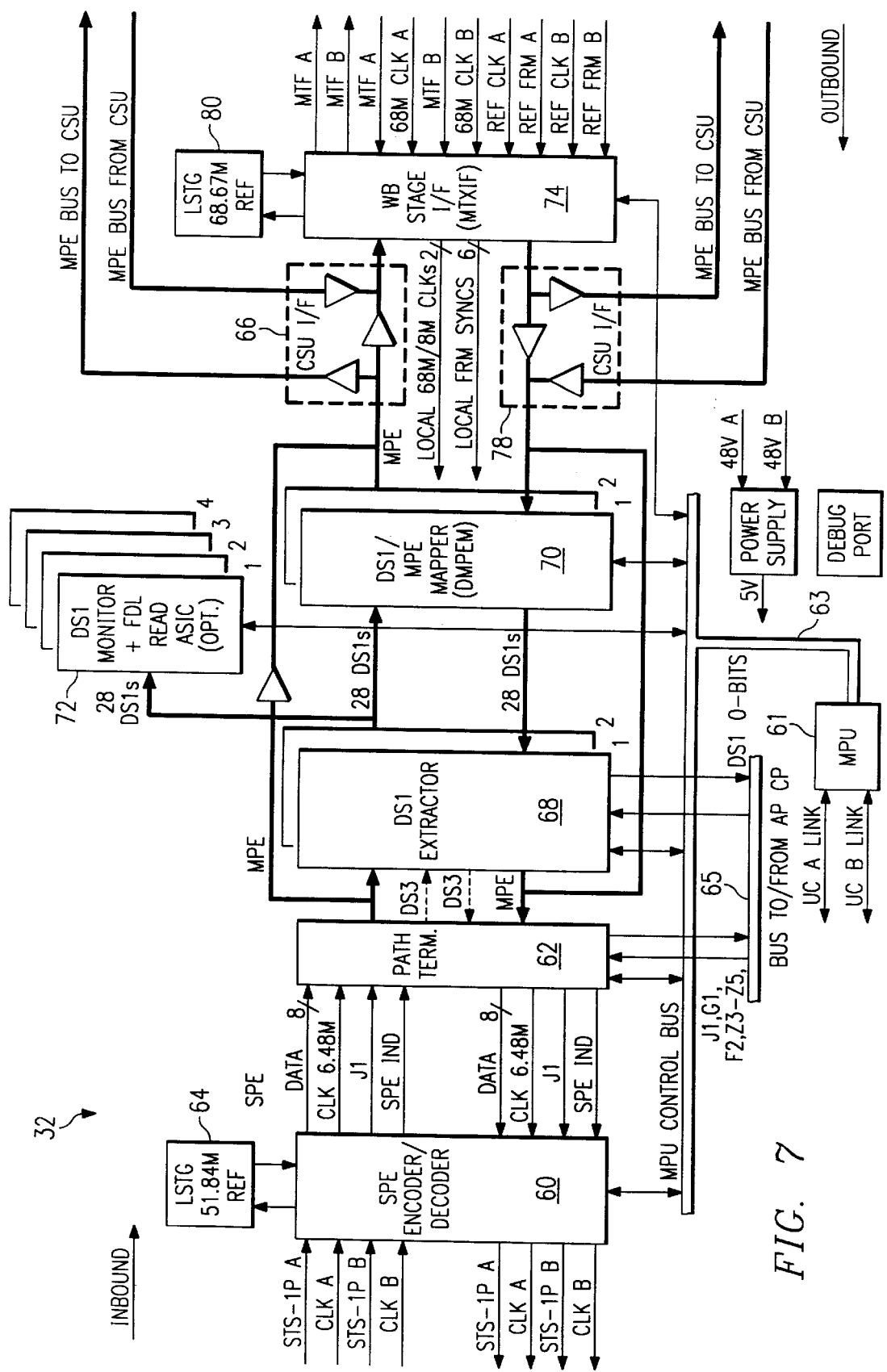
FIG. 7 illustrates a block diagram of a tributary processor within the tributary signal processing subsystem.

FIG. 7 is a block diagram of a tributary processor 32. Tributary processor 32 includes a synchronous payload envelope (SPE) encoder/decoder 60 that receives a pair of STS-1P signals from redundant matrix interfaces 30. SPE encoder/decoder 60 performs framing, phase alignment, and performance monitoring on both STS-1P signals. SPE encoder/decoder 60 selects one of the STS-1P signals based on the performance monitor results or as specified through a microprocessor unit 61 over bus 63 by unit controller 38. The synchronous payload envelope of the selected STS-1P signal is located and transmitted to a path terminator 62 in byte parallel form at a 6.48 MHz rate. SPE encoder/decoder 60 also generates a local timebase using one of the STS-1P clock signals. SPE encoder/decoder 60 performs clock tests and selection independently of the data selection. The selected clock signal is used as a reference for a voltage control oscillator 64 to generate a local 51.84 MHz clock reference, the rate of an STS-1P signal.

Path terminator 62 receives the synchronous payload envelope from SPE encoder/decoder 60 and performs overhead processing of individual bytes for access by attached processor 36 over bus 65. For synchronous processing, path terminator 62 extracts VT SPEs from the STS-1P SPE using pointer processing. New VT frames are created and locked to the local timebase in frequency and phase and the VT SPEs are mapped into the new frames through pointer processing. Path terminator 62 maps the VT SPEs into matrix payload envelope (MPE) frames using the local timing. For synchronous VT to VT cross-connects, the MPE frames are transmitted to a channel shelf unit interface 66 in byte parallel form at an effective rate of 8.584 MHz. For gateway operations, the MPE frames are transmitted to a DS1 extractor 68. For asynchronous processing, path terminator 62 extracts DS3 data and clock signals from the STS-1P SPE and transmits the DS3 data and clock signals to DS1 extractor 68.

During gateway operations, DS1 extractor 68 receives the MPE frames from path terminator 62 and extracts the VT1.5 SPE using pointer processing. DS1 signals are extracted from the VT1.5 SPE through destuffing and overhead bits and are output to attached processor 36 over bus 65 for external access. DS1 extractor 68 desynchronizes the DS1 signals to produce smooth DS1 data and clock signals for transmission to an MPE mapper 70.

During asynchronous processing, DS1 extractor 68 receives the DS3 data and clock signals from path terminator 62, extracts DS2 signals from the DS3 frame, and extracts the DS1 signals from the DS2 frames. As in the first configuration, DS1 extractor 68 desynchronizes the DS1 signals to produce data and clock signals for each DS1 signal. Each DS1 data and clock signals are transmitted to MPE mapper 70. Each DS1 data and clock signal may also be transmitted to a DS1 monitor 72 that provides enhanced performance monitoring at the DS1 level.

MPE mapper 70 receives each DS1 data and clock signal from DS1 extractor 68. The DS1 signals are mapped into a matrix payload capacity (MPC) SPE using local timing. The MPC data is then mapped into an MPE frame using local timing. The MPE signals are transmitted to channel service unit 66 in byte parallel form at an effective rate of 8.584 MHz.

Channel service unit interface 66 receives MPE signals from either path terminator 62 for synchronous VT to VT cross-connect or MPE mapper 70 during asynchronous and gateway operations. Channel service unit interface 66 transmits MPE data to a channel service unit or routes the MPE data directly to a wideband stage interface 74. Channel service units perform line control and performance monitoring of DS1 signals. The data path configuration of channel service unit 66 is controlled by microprocessor unit 61 over bus 63. Wideband stage interface 74 receives MPE data from channel service unit interface 66 and performs verification of data fields within the MPE data. Wideband stage interface 74 converts the MPE signals from byte interleave format to a bit interleave format in order to convert the MPE signals into a matrix transport format (MTF) signal. The MTF signal is locked to the local wideband timebase by a voltage controlled oscillator 80 having a reference frequency of 68.672 MHz. The MTF signal is transmitted to redundant wideband digital matrix unit originating/terminating stage 34.

During outbound operation, tributary processor 32 receives a pair of MTF signals from redundant wideband digital matrix unit originating/terminating stage 34 at wideband stage interface 74. Wideband stage interface 74 performs framing and phase alignment on both MTF signals and converts the MTF signals from a bit interleave format to a byte interleave format such that MPE signals can be extracted. Wideband stage interface 74 includes plane select logic that selects one of the two MPE signals based on performance monitor results or as specified by unit controller 38 through microprocessor unit 61. The selected MPE signals are transmitted to outbound channel service unit interface 78 in byte parallel form at an effective rate of 8.584 MHz. Wideband stage interface 74 also generates a local timebase using 8.584 MHz reference clocks and frame synchronization signals received from wideband digital matrix unit originating/terminating stage 34. Wideband stage interface 74 performs clock test and selection independently of data selection. The selected clock and frame synchronization signals are used as a reference for voltage controlled oscillator 80 in order to generate the local 68.672 MHz clock reference, the wideband subsystem rate.

Channel service unit interface 78 receives MPE signals from wideband stage interface 74. Channel service unit interface 78 transmits MPE signals to a channel service unit shelf or routes the MPE data directly to MPE mapper 70 for asynchronous and gateway processing or path terminator 62 for synchronous processing. The data path configuration of channel service unit interface 78 is controlled by microprocessor unit 61.

MPE mapper 70 receives outbound MPE data from channel service unit interface 78 and performs parity and verification checks. MPE mapper 70 extracts MPC signals from the MPE frames. DS1 data and clock signals are extracted from the synchronous payload envelope of the MPC signal and the DS1 signals are desynchronized to generate smooth DS1 data and clock signals. The DS1 data and clock signals are then transmitted to DS1 extractor 68.

DS1 extractor 68 receives the DS1 data and clock signals from MPE mapper 70. For gateway operations, the DS1 signals are mapped into VT1.5 signals. The VT1.5 signals are mapped into the MPE format and the MPE data is output on a byte parallel bus at a 8.584 MHz rate to path terminator 62. For asynchronous operations, DS1 extractor 68 maps the DS1 signals into DS2 frames and then maps the DS2 signals into a DS3 frame. DS3 clock and data signals are output to path terminator 62.

Path terminator 62 receives outbound MPE data from DS1 extractor 68 during gateway processing, or channel service unit interface 78 during synchronous processing, or DS3 clock and data from DS1 extractor 68 during asynchronous processing. Path terminator 62 performs monitoring and verification checks of the data. For synchronous and gateway processing, VT signals are extracted from the MPE frames and the VT signals are mapped into an STS-1P SPE that is created based on the local timebase. For asynchronous processing, path terminator 62 receives outbound DS3 clock and data from DS1 extractor 68 and maps the DS3 signal into an STS-1P SPE through a stuffing process. Path terminator 62 creates overhead data from the STS-1P SPE or receives overhead data from attached processor 36 over bus 65. Path terminator 62 transmits the STS-1P SPE to SPE encoder/decoder 60 in byte parallel form at a 6.48 MHz rate.

SPE encoder/decoder 60 receives the STS-1P SPE from path terminator 62 and creates an STS-1P frame locked to the local timebase in frequency and phase. The STS-1P SPE is mapped into the STS-1P frame using pointer processing to adjust for frequency and phase differences between the broadband and wideband timebases. SPE encoder/decoder 60 transmits the STS-1P signal to redundant matrix interfaces 30.

Tributary processor 32 contains two different timebases. Broadband timing at 51.84 MHz is received with the STS-1P signal. This timing is terminated upon termination of the STS-1P signal at path terminator 62. The inbound broadband timebase is used to generate the outbound STS-1P signal through loop timing. The local wideband timebase for tributary processor 32 is derived from wideband clock references received from wideband digital matrix unit originating/terminating stage 34. One clock reference is selected as the reference clock for the phase lock loop of 68.762 MHz VCO 80 in order to generate the local wideband timebase. For DS3 signal application, inbound DS3 timing is derived from a desynchronizer for destuffing the STS-1P SPE that includes a 44.736 MHz PLL. Outbound DS3 timing is generated by a 44.763 MHz oscillator.

Figure 8A:
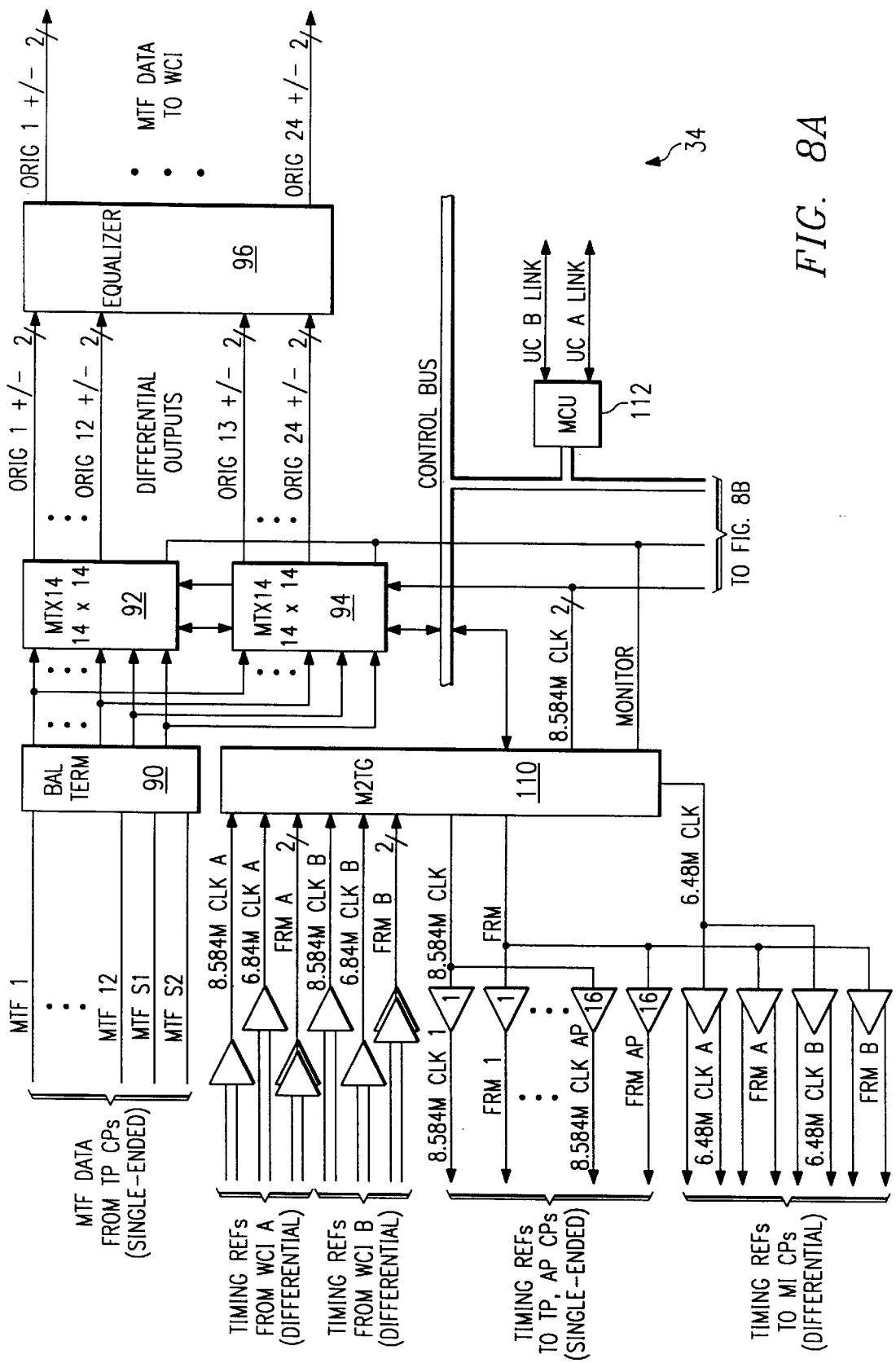
FIGS. 8A–B illustrate block diagrams of an originating/terminating stage within the tributary signal processing subsystem.
Figure 8B:
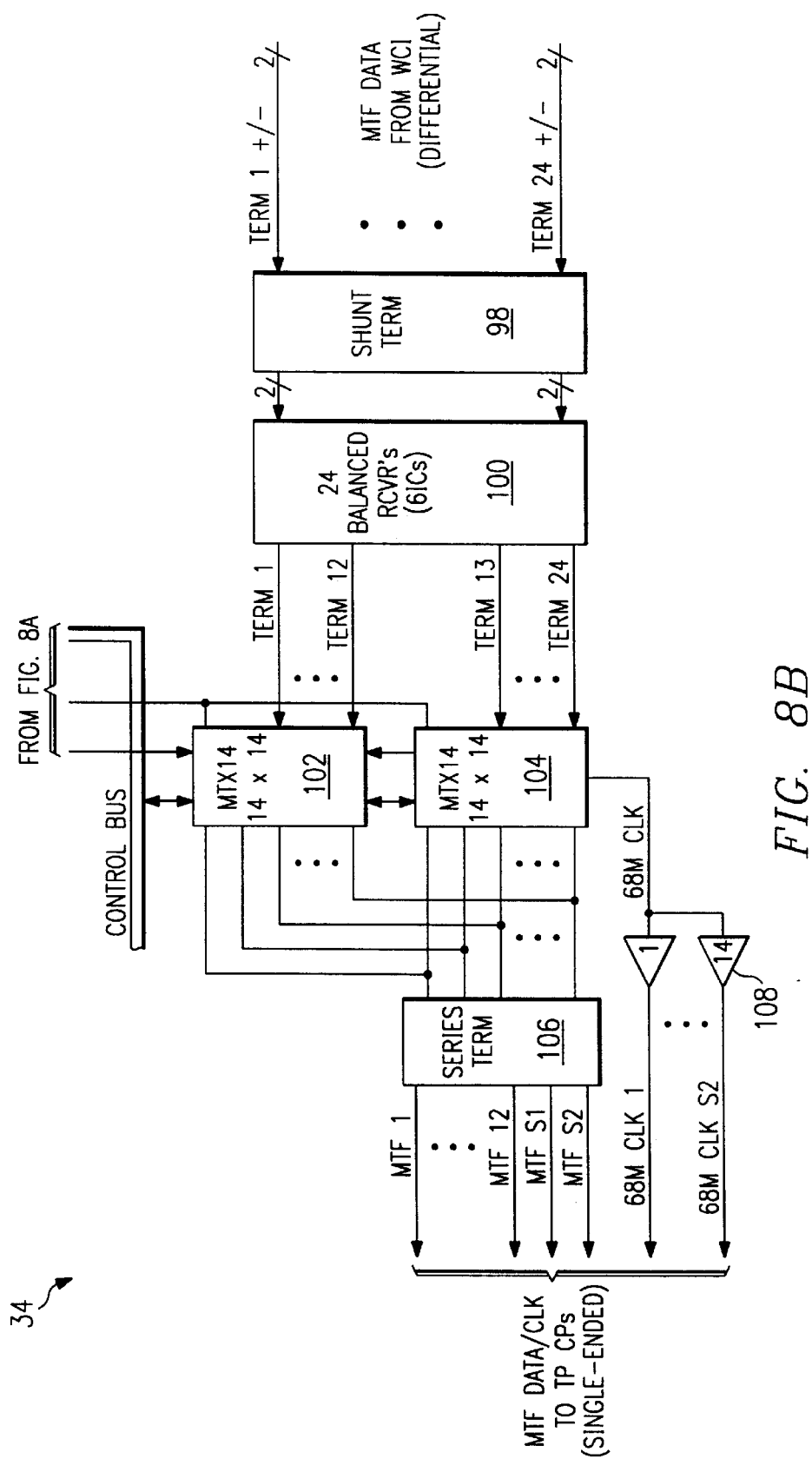

FIGS. 8A and 8B are block diagrams of wideband digital matrix unit originating/terminating stage 34. Wideband digital matrix unit originating/terminating stage 34 receives the fourteen MTF signals, one from each tributary processor 32, at a balanced terminator 90. Balanced terminator 90 includes a bank of resistors to shunt terminate each MTF signal. The shunt terminated MTF signals are routed to two 14×14 crosspoint switches 92 and 94 in order to implement a 12×24 switch function. The MTF signals are converted to differential signals through balanced drivers within crosspoint switches 92 and 94. The differential MTF signals are routed to an equalizer 96 for transmission to wideband matrix 22 center stage.

In the outbound direction, wideband digital matrix unit originating/terminating stage 34 receives twenty-four differential MTF signals from wideband matrix center stage 22 at a shunt terminator 98. Shunt terminator 98 includes a bank of resistors to shunt terminate each differential MTF signal.

The shunt terminated differential MTF signals are converted to single ended MTF signals by a balanced receiver 100. The single ended MTF signals are routed to two 14×14 crosspoint switches 102 and 104 to implement a 24×12 switch function. The output of crosspoint switches 102 and 104 become fourteen MTF data signals and fourteen 68.672 MHz clock signals transmitted to tributary processors 32 by a series terminator 106 and drivers 108, respectively.

Timing interfacing is performed by a timing generator 110. Timing generator 110 receives 8.584 MHz, 6.84 MHz, and frame signals from wideband matrix center stage 22. Timing generator 110 performs clock and multiframe test and select functions. Timing generator 110 provides an appropriate 8.584 MHz clock signal to crosspoint switches 92, 94, 102, and 104 for receipt and transmission of MTF signals. Timing generator 110 also provides reference single ended 8.584 MHz clock and frame signals to tributary processors 32 and attached processors 36. Reference differential 6.48 MHz clock and frame signals are provided to matrix interfaces 30 by timing generator 110. A microprocessor unit 112 communicates with unit controller 38 to control configuration and operation of each component within wideband digital matrix unit originating/terminating stage 34.

Figure 9:
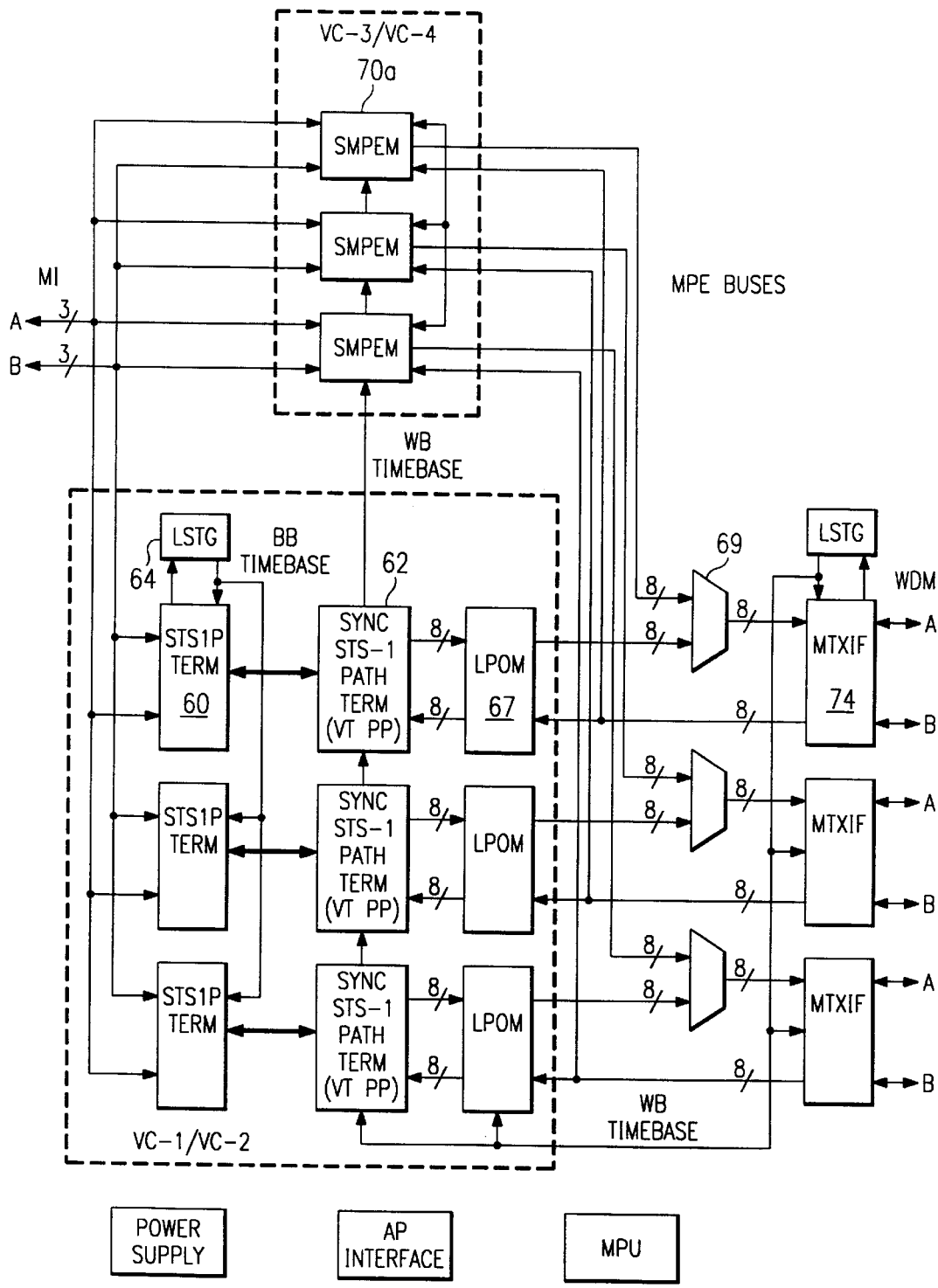
FIG. 9 illustrates a block diagram of an alternative example of the tributary processor for the tributary signal processing subsystem.

For international applications, tributary processor 32 has a slightly different but related configuration. FIG. 9 is a block diagram of a tributary processor 32a that implements Synchronous Digital Hierarchy signals. Tributary processor 32a operates in one of two modes—low order and high order. Each mode has an independent data path within tributary processor 32a. Three STS-1P signals may be accommodated by tributary processor 32a.

Tributary processor 32a receives 2 sets of three STS-1P signals from redundant matrix interfaces 30 and selects appropriate STS-1P signals for termination. Pointer processing is performed and retimed VC signals are demultiplexed from the STS-1P SPE. The VC signals are mapped into an MPE and converted into MTF signals for transport through the matrix. Similarly in the outbound direction, tributary processor 32a receives three pairs of MTF signals and selects appropriate MTF signals for conversion into MPE signals. VC signals are demapped from the MPE signals and multiplexed into an STS-1P SPE. The STS-1P signal is reconstructed from the STS-1P SPE for transport to matrix interface 30.

For the low order mode, tributary processor 32a includes SPE encoder/decoders 60 for receiving each set of STS-1P signals. SPE encoder/decoder 60 performs framing, phase alignment, and monitoring and selects an appropriate STS-1P signal based on performance monitoring results or as determined by unit controller 38. The STS-1P SPE is located and transmitted to path terminator 62 in byte parallel form at a 6.48 MHz rate. SPE encoder/decoder 60 also generates a local broadband timebase using the redundant STS-1P clock signals. Clock test and selection is performed independently of data selection. The selected clock is used as a reference for VCO 64.

Path terminator 62 receives the STS-1P SPE from SPE encoder/decoder 60 and performs overhead processing of selected bytes. Overhead bytes are multiplexed for external access through attached processor 36. The VC SPE is extracted from the STS-1P SPE and mapped into new VC frames created and locked to the local timebase. VC signals are mapped into MPE frames using local wideband timing. The MPE signals are transmitted in byte parallel form having an effective rate of 8.584 MHz to an in-line monitor 67.

In-line monitor 67 receives the MPE signals from path terminator 62 and performs VC-1 and VC-2 signal monitoring. Performance defects, anomalies, and alarms are checked by in-line monitor 67 for fault isolation purposes. In-line monitor 67 transfers the MPE signals to wideband stage interface 74 through selector 69 in order generate the MTF signals for matrix transmission.

In the outbound direction of the low order mode, wideband state interface 74 receives MTF signals from redundant wideband digital matrix unit originating/terminating stage 34 and generates MPE signals therefrom. In-line monitor 67 receives MPE signals from wideband stage interface 74 for detection and reporting of faults. Path terminator 62 receives the MPE signals from in-line monitor 67; verifies overhead data, and extracts VC signals from the MPE frames. An STS-1P SPE is created based on the local timebase and the VC signals are multiplexed into the STS-1P SPE. Overhead bytes are sourced internally or received from attached processor 36. The STS-1P SPE is transmitted in byte parallel form at a 6.48 MHz rate to SPE encoder/decoder 60. SPE encoder/decoder 60 maps the STS-1P SPE into an STS-1P frame locked to the local broadband timebase. The STS-1P signal is then transmitted to matrix interface 30.

For the high order mode, STS-1P signals are received at an MPE mapper 70a from redundant matrix interfaces 30. the selected STS-1P signal is locked to the wideband timebase. The STS-1P SPE is extracted and mapped into the MPE format. The STS-1P SPE may carry any signal type requiring standalone broadband cross-connection. The MPE signal is transferred to wideband stage interface 70 through selectors 69 for MTF signal generation. Selectors 69 select the appropriate MPE signals according to the mode of operation desired for tributary processor 32a.

In the outbound direction of the high order mode, wideband stage interface 74 receives MTF signals from wideband matrix center stage 22 and creates MPE signals in response thereto. Wideband stage interface 74 transfers the MPE signals to MPE mapper 70a. MPE mapper 70a performs fault isolation and recovers the STS-1P SPE from the MPE signals, locking the STS-1P signal to the broadband timebase. The STS-1P signal is reconstructed from the STS1P SPE and transmitted to matrix interfaces 30.

Figure 10:
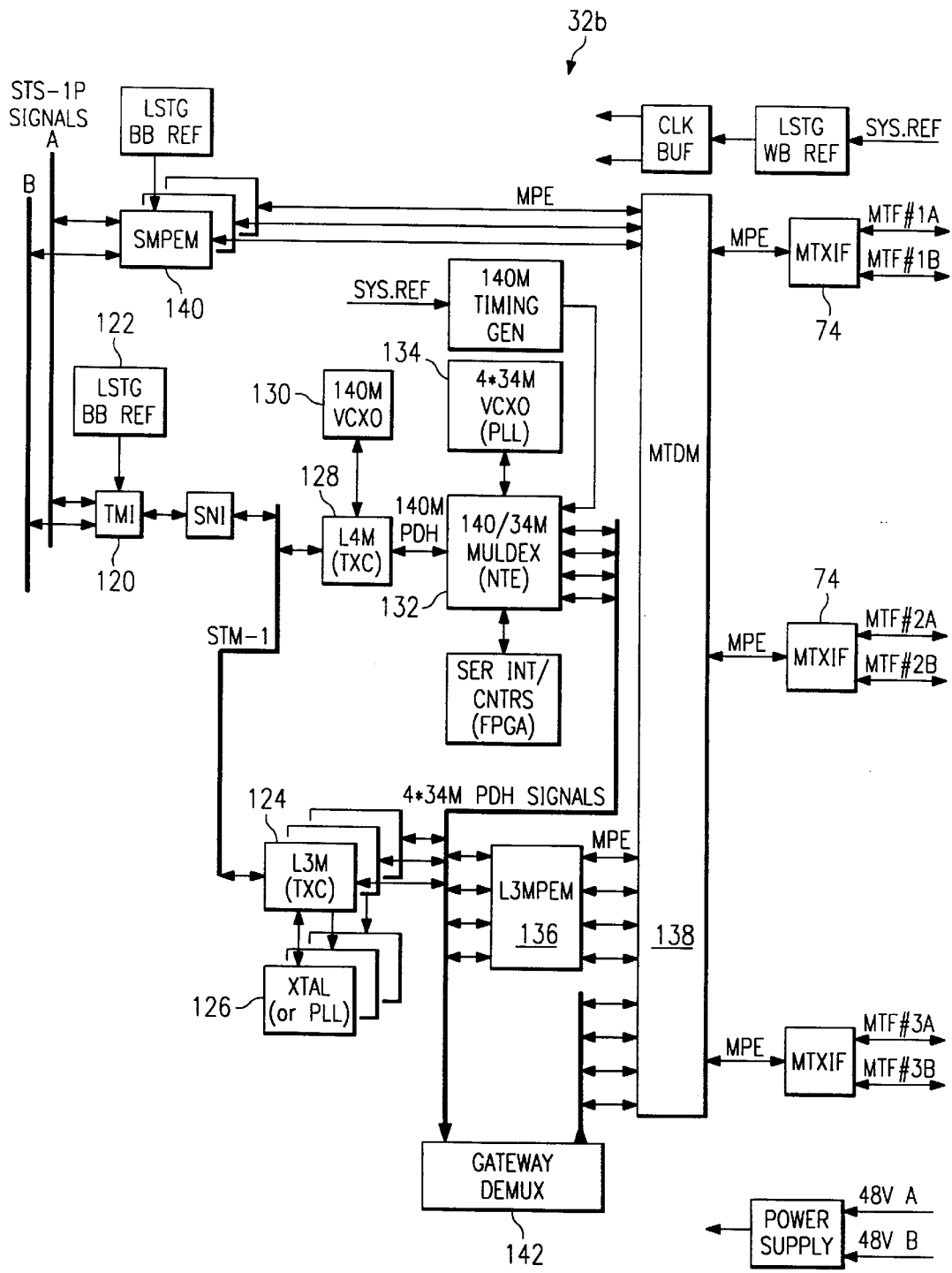
FIG. 10 illustrates a block diagram of another alternative example of the tributary processor for the tributary signal processing subsystem.

FIG. 10 is a block diagram of a third tributary processor 32b that interfaces with Plesiochronous Digital Hierarchy signals. PDH signals include asynchronous signals at 140M, 34M, and 2M rates. In the inbound direction, tributary processor 32b extracts VC-3 or VC-4 based STM-1 signals from the STS-1P signals. The VC-4 based STM-1 signal contains a 140M PDH signal payload that is terminated, demultiplexed, and desynchronized into constituent 3YM signals. The VC-3 based STM-1 signal contains a 34M PDH signal that is terminated and extracted. The 34M signals are asynchronously mapped into MPE signals or further demultiplexed to 2M signals before being mapped into MPE signals. Mapping of 2M signals requires one MPE channel whereas 34M signals require sixteen MPE channels. MPE signals are converted to the MTF format for transmission through wideband matrix center stage 22.

In the outbound direction, tributary processor 32b receives MTF signals from wideband digital matrix unit originating/terminating stage 34, and converts a selected MTF signal into twenty-eight MPE signals. The MPE signals are processed according to their payloads. For 34M PDH payloads, the payloads are extracted, overhead data bits inserted, and outgoing 34M PDH signals are desynchronized. Four 34M signals are multiplexed into a 140M PDH signal for mapping into a VC-4 contain to obtain a VC-4 based STM-1 signal. A VC-3 based STM-1 signal can be obtained by mapping three 34M PDH signals into a VC-3 container. For VC-12 payloads, the VC-12 signals are extracted and demapped to obtain E1 signals. E1 signals are asynchronously multiplexed into a 34M PDH signal. VC-4 or VC-3 based STM-1 signals are generated from 34M PDH signals as described above. The STM-1 signals are further processed to create three STS-1P signals for transfer to matrix interfaces 30.

For transparent cross-connection of STS-1P SPEs, tributary processor 32b receives STS-1P signals from redundant matrix interfaces 30 at an STS-1P mapper 140. STS-1P mapper 140 selects the appropriate signal for mapping into the MPE format. The mapping process performed by STS-1P mapper 140 uses a stuffing mechanism that allows the mapped MPE signals to acquire the wideband system timing. The MPE signals are transmitted to an MPE time division multiplexer 138 for path provisioning before conversion into the MTF format by wideband stage interface 74.

For PDH payloads, tributary processor 32b receives STS-1P signals from redundant matrix interfaces 30 at a tributary matrix interface 120. Tributary matrix interface 120 performs plane selection on the STS-1P signal pairs, extracts STS-1P SPEs, and performs phase alignment. Pointer processing is accomplished on the frame aligned STS-1P SPEs to lock the signals to the wideband timebase. The STS-1P SPE is reformatted and mapped into a byte parallel STM-1 signal at a 19.44 MHz rate derived from a local 6.48 MHz reference 122.

For VC-3 processing of PDH payloads, The STM-1 signal is sent to a VC-3 mapper 124 that terminates the path overhead for the provisioned VC-3 and extracts and desynchronizes the 34M payload through a crystal oscillator 126. For VC-4 processing of PDH payloads, the STM-1 signal is sent to a VC-4 extractor 128 that terminates the VC-4 payload path overhead, desynchronizes the payload through a crystal oscillator 130 to extract the 140M payload. The 140M payload is transferred to a muldex 132 that frames, monitors, and asynchronously demultiplexes the signal into four data streams of 34M each. The 34M PDH signals are desynchronized by a crystal oscillator 134.

The 34M PDH signals from either VC-3 extractor 124 or VC-4 mapper 128 are framed, monitored, and mapped into the MPE format by MPE mapper 136. Control and stuffing mechanisms allow for the 34M PDH signals to be mapped to twenty-eight MPE channels. The MPE signals are transmitted to an MPE time division multiplexer 138 in byte parallel form at an effective rate of 8.584 MHz. MPE time division multiplexer 138 multiplexes the MPE channels such that the appropriate data path is selected for VC-3/VC-4 signals, 34M PDH signals, or E1 signals. The three byte interleaved parallel MPE data signals are delivered to wideband stage interface 74 for conversion into bit interleaved MTF signals and transmission as a serial 68,672 Mbit/sec stream to wideband digital matrix unit originating/terminating stage 34.

Figure 11:
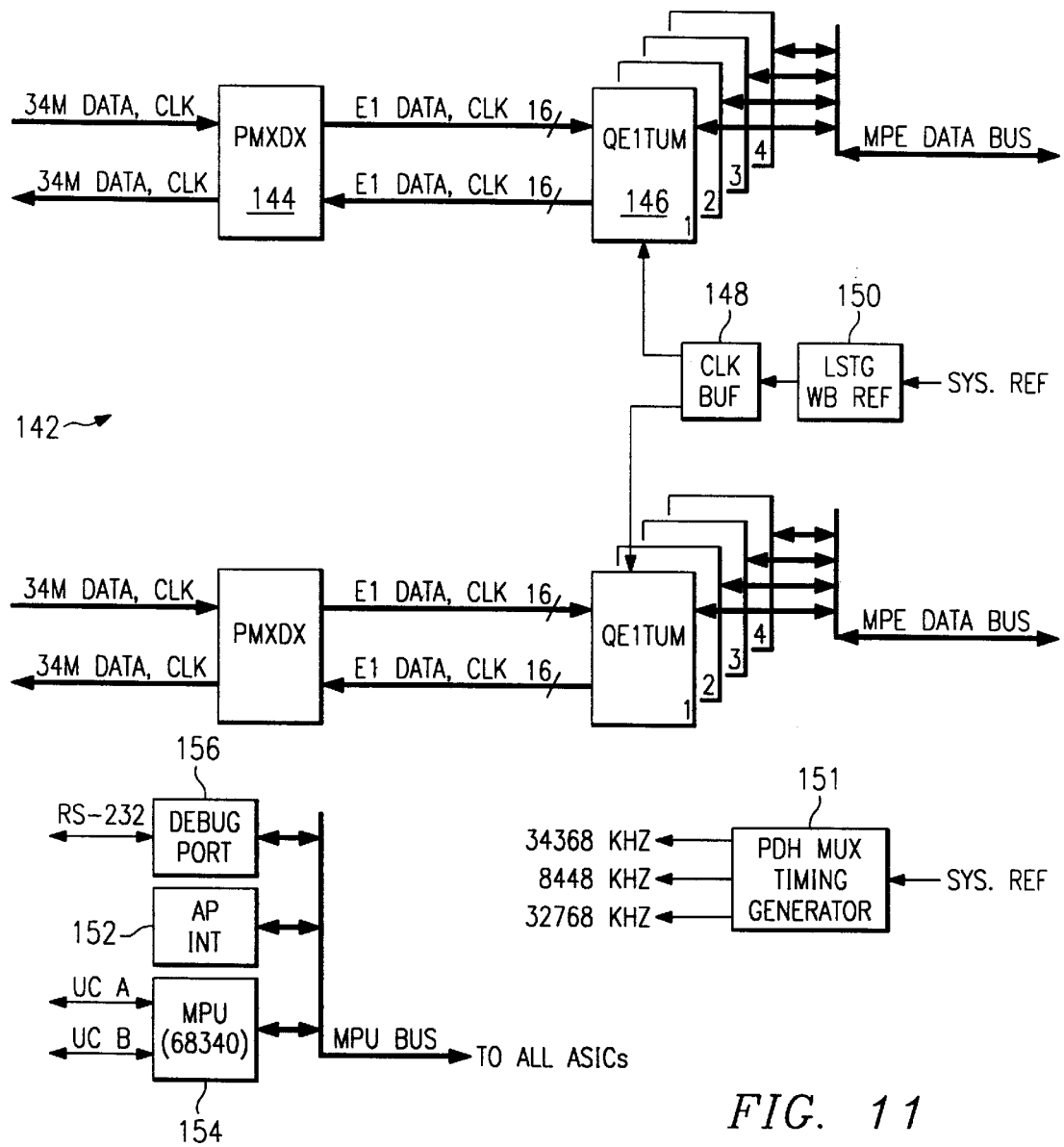
FIG. 11 illustrates a block diagram of a gateway demux for the other alternative example of the tributary processor.

The 34M PDH signals from either VC-3 extractor 124 or VC-4 mapper 128 may be sent to a gateway demux 142. FIG. 11 shows a block diagram of gateway demux 142. Gateway demux 142 converts 34M PDH signals into their 2M components. The 2M components are mapped into MPE signals and returned to MPE time division multiplexer 138 for processing into MTF signals as previously discussed.

Gateway demux 142 includes a PDH demux 144 and a quad E1 signal mapper 146. PDH demux 144 receives the 34M PDH signals from VC-3 extractor 124 or VC-4 extractor 128. PDH demux 144 frames up the received 34M PDH signals and provides access to overhead data bits. Asynchronous demultiplexing is performed to extract four 8M PDH signals from each 34M PDH signal. Each 8M PDH signal is further demultiplexed into four E1 signals, resulting in sixteen E1 signals for each 34M PDH signal. Each E1 signal is desynchronized to remove overhead gaps. A clock buffer 148 and a reference timebase 150 provide the wideband timing calibration for the MPE signals of gateway demux 142.

Quad E1 signal mapper 146 receives the E1 signals from PDH demux 144 for mapping into a VC-12 container. Quad E1 signal mapper 146 maps for E1 signals to four TU-12 SDH signals. The TU-12 SDH signals are converted into MPE data signals for transmission to MPE time division multiplexer 138. Full performance monitoring is available here as well as elsewhere throughout tributary processor 32b. A PDH timing generator 151 provides control timing for gateway demux 142.

Tributary processor 32b also includes an attached processor interface 152 for providing control, data conversion, stuffing/destuffing, and multiplexing of serial overhead to/from VC-3 extractor 124 and VC-4 extractor 128 for gateway demux 142 and all units within tributary processor 32b. A local gateway MPU 154 communicates with unit controllers 38, controls configuration of all units within tributary processor 32b, and maintains performance monitoring counts at the 2M, 8M, and 34M levels. An RS-232 debug port provides external access to tributary:processor 32b.

For processing of MTF signals, wideband stage interface 74 receives three pairs of MTF signals from wideband digital matrix unit originating/terminating stage 34. For each pair of MTF signals, one signal is selected and terminated. After framing and phase alignment are performed, the MTF signals are converted from the bit interleaved format to the byte interleaved format of the MPE signals. Selected MPE signals are sent to MPE time division multiplexer 138 in byte parallel form at an effective rate of 8,584 MHz. MPE time division multiplexer 138 demultiplexes three MPE signals for the provisioned VC-3/VC-4 signals, 34M PDH signals, or E1 signals.

For MPE signals containing STS-1P SPE payloads, STS-1P mapper 140 provides the necessary processing functions to generate the outgoing STS-1P signals.

For MPE signals containing 34M PDH signals, MPE mapper 136 extracts the payloads, inserts overhead data bits, and provides desynchronization for the outgoing 34M PDH signals. The 34M PDH signals take one of two provisional paths. For VC-4 mapping, muldex 132 multiplexes 34M PDH signal into a 140M PDH signal which is mapped into a VC-4 container by VC-4 extractor 128, resulting in a VC-4 based STM-1 signal. For VC-3 mapping, VC-3 extractor 124 provides a VC-3 based STM-1 signal from three 34M PDH signals. Appropriate STM-1 signals are converted into three STS-1P signals by tributary matrix interface 120.

For MPE signals containing VC-12 payloads, gateway demux 142 extracts the VC-12 payloads, performs demapping, and extracts E1 signals at the quad E1 signal mapper 146. E1 signals are then asynchronously multiplexed into a 34M PDH signal by PDH demux 144. The 34M PDH signals are routed through either VC-3 extractor 124 or VC-4 extractor 128 for ultimate conversion into STS-1P signals by tributary matrix interface 120.

In summary, a tributary signal processing subsystem provides the interface between a wideband subsystem and a narrowband subsystem, broadband subsystem, or network signals. The tributary signal processing subsystem includes tributary processors that convert STS-1P signals to a matrix transport format for cross-connections within the wideband subsystem and convert the matrix transport format signals to STS-1P signals for transmission back to the broadband subsystem, narrowband subsystem, or network. In this manner, signal cross-connections can occur regardless of the type of signals involved.

Thus, it is apparent that there has been provided, in accordance with the present invention, a processor device for terminating and creating a synchronous transport signal that satisfies the advantages set forth above. Though the present invention has been described in detail, it should be understood that various changes, substitutions, and alterations can be made herein. For example, though shown in operation within an integrated multi-rate cross-connect system architecture, a tributary processor may be employed in other switching architectures while using any number of signals and connections. Other examples are readily ascertainable by one skilled in the art and could be made without departing from the spirit and scope of the present invention as defined by the following claims.

What is claimed is:

1. A method of terminating and creating a synchronous transport signal, comprising steps of:

receiving an inbound synchronous transport signal;

extracting an inbound synchronous payload envelope of the inbound synchronous transport signal;

mapping embedded signals within the inbound synchronous payload envelope into an inbound matrix payload envelope format, the inbound matrix payload envelope format having a byte interleaved structure; and generating an inbound matrix transport format having a bit interleaved structure from the inbound matrix payload envelope format, the inbound matrix transport format carrying embedded signals for cross-connection to appropriate destinations.

2. The method of claim 1, further comprising steps of:

isolating DS-1 network signals from the inbound synchronous payload envelope;

placing the DS-1 network signals into the inbound matrix payload envelope format.

3. The method of claim 1, further comprising steps of:

generating DS-3 network signals from the inbound synchronous payload envelope;

isolating DS-1 network signals from the DS-3 network signals;

placing the DS-1 network signals into the inbound matrix payload envelope format.

4. The method of claim 2, further comprising a step of:

performing fault isolation on the DS-1 network signals.

5. The method claim 1, further comprising a step of:

locking the inbound synchronous payload envelope to a frequency of the inbound synchronous transport signal.

6. The method of claim 1, further comprising a step of:

locking the inbound matrix payload envelope format to a wideband timebase.

7. The method of claim 1, further comprising steps of:

receiving an outbound matrix transport format and corresponding clock signals;

converting the outbound matrix transport format into an outbound matrix payload envelope.

8. The method of claim 7, further comprising steps of:

convert the outbound matrix payload envelope into an outbound synchronous payload envelope;

generating an outbound clock signal corresponding to the outbound synchronous payload envelope.

9. The method of claim 8, further comprising steps of:

converting the outbound synchronous payload envelope into an outbound synchronous transport signal;

generating a network clock signal corresponding to the outbound synchronous transport signal;

transmitting the outbound synchronous transport signal with the network clock signal.

10. The method claim 7, further comprising a step of:

desynchronizing DS-1 network signals from the outbound matrix payload envelope.

11. The method of claim 10, further comprising a step of:

placing the desynchronized DS-1 network signals into the outbound matrix payload envelope.

12. The method of claim 10, further comprising a step of:

converting the desynchronized DS-1 signals into corresponding DS-3 network signals.

13. A method of terminating and creating a synchronous transport signal, comprising steps of:

receiving an inbound synchronous transport signal;

extracting an inbound synchronous payload envelope from the inbound synchronous transport signal;

mapping the inbound synchronous payload envelope into an inbound synchronous transfer mode signal;

extracting plesiochronous digital hierarchy signals from the inbound synchronous transfer mode signal;

placing the plesiochronous digital hierarchy signals into a plurality of channels having a matrix payload envelope signal format;

multiplexing the plurality of channels into byte interleaved parallel form;

converting the multiplexed byte interleaved parallel form into bit interleaved matrix transport signals; and serially transmitting the bit interleaved matrix transport signals.

14. The method of claim 13, further comprising a step of:

processing lower rate components of the plesiochronous digital hierarchy signals prior to placement into the plurality of channels.

15. The method of claim 13, further comprising a step of:

processing thirty-four megabit components of the plesiochronous digital hierarchy signals.

16. The method of claim 13, further comprising a step of:

processing one hundred forty megabit components of the plesiochronous digital hierarchy signals.

17. The method of claim 16, further comprising a step of:

demultiplexing and desynchronizing the one hundred forty megabit components into thirty-four megabit components.

18. The method of claim 13, further comprising a step of:

directly converting the inbound synchronous transport signals into separate matrix payload envelope formats;

multiplexing the separate matrix payload envelope formats into byte interleaved parallel form.

* * * * *

UNITED STATES PATENT AND TRADEMARK OFFICE
CERTIFICATE OF CORRECTION

PATENT NO. : 5,850,387
DATED : December 15, 1998
INVENTOR(S) : Lyon, et al.

It is certified that error appears in the above-indentified patent and that said Letters Patent is hereby corrected as shown below:

Title page, [75] after "Richard Schroder, Plano", insert -- Gary D. Hanson, Plano --.

Signed and Sealed this

Nineteenth Day of October, 1999

Attest:

Q. TODD DICKINSON

Attesting Officer

Acting Commissioner of Patents and Trademarks